United States Patent [19]

McHardy et al.

[11] Patent Number: 5,315,162
[45] Date of Patent: May 24, 1994

[54] ELECTROCHEMICAL SYNAPSES FOR ARTIFICIAL NEURAL NETWORKS

[75] Inventors: John McHardy, Westlake Village; Carl W. Townsend, Los Angeles; Lin R. Higley, Laguna Hills; Frank A. Ludwig, Rancho Palos Verdes, all of Calif.

[73] Assignee: Hughes Aircraft Company, Los Angeles, Calif.

[21] Appl. No.: 770,817

[22] Filed: Oct. 4, 1991

[51] Int. Cl.$^5$ .................. G06G 7/06; H03H 11/00
[52] U.S. Cl. ................................ 307/201; 395/24; 338/80; 338/94
[58] Field of Search ............... 307/201; 395/21, 23, 395/24; 338/80, 82, 94

[56] References Cited

U.S. PATENT DOCUMENTS

| | | | |
|---|---|---|---|
| 3,222,654 | 12/1965 | Widrow et al. | 301/201 |
| 3,453,602 | 7/1969 | Stewart | 395/24 |
| 4,945,257 | 7/1990 | Marrocco, III | 307/201 |
| 4,949,064 | 8/1990 | Minoura et al. | 338/80 |

*Primary Examiner*—William L. Sikes
*Assistant Examiner*—Kenneth Parker
*Attorney, Agent, or Firm*—M. E. Lachman; M. W. Sales; W. K. Denson-Low

[57] ABSTRACT

An electrochemical synapse adapted for use in a neural network which includes an input terminal and an output terminal located at a distance of less than 100 microns from the input terminal. A permanent interconnect having controllable conductivity is located between the two inputs. The conductivity of the permanent interconnect is controlled by either growing or eliminating metallic whiskers between the inputs. The growth and elimination of whiskers provides a rapid and controllable electrochemical synapse. Partial neural network systems are disclosed utilizing the electrochemical synapse.

22 Claims, 1 Drawing Sheet

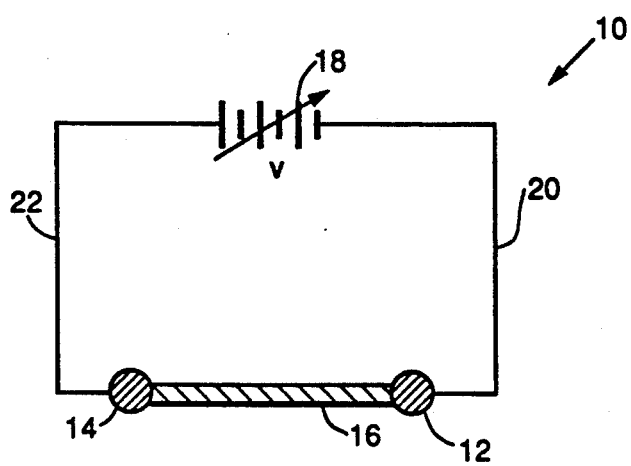
FIG. 1.
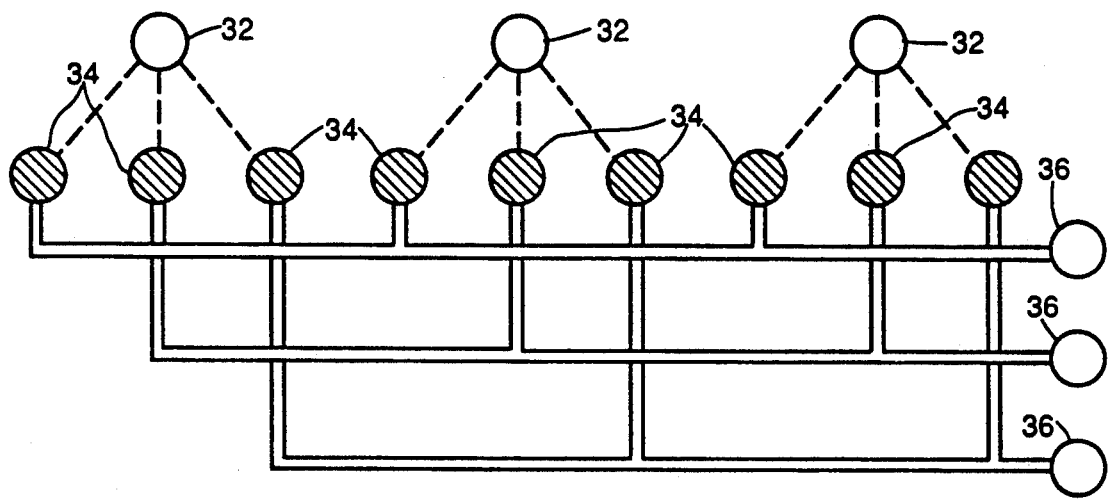
FIG. 2.
FIG. 3.
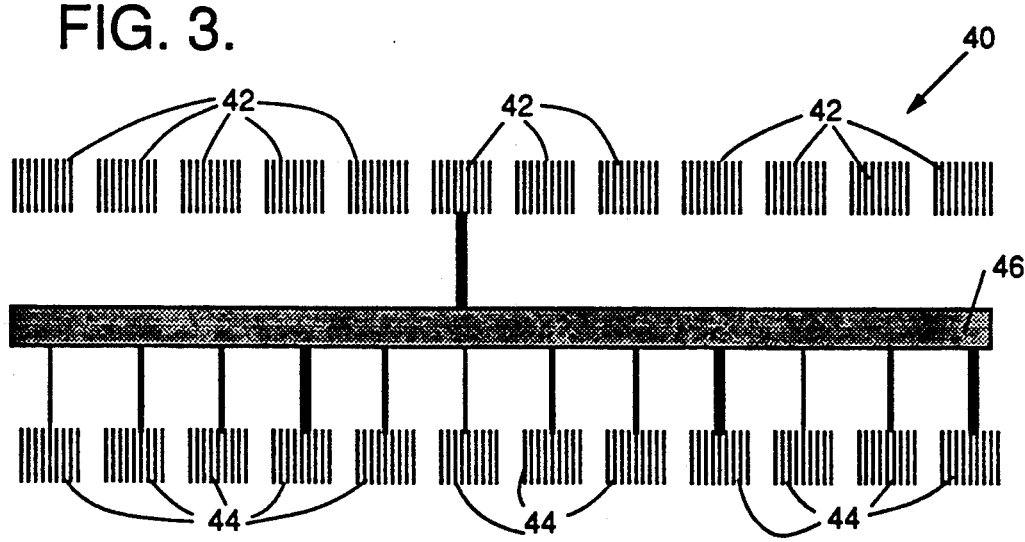

ELECTROCHEMICAL SYNAPSES FOR ARTIFICIAL NEURAL NETWORKS

BACKGROUND OF THE INVENTION

1. Field of the Invention

The present invention relates generally to neurons in an artificial neural network. More particularly, the present invention relates to solid state, adjustable weight synapses for controlling the interaction of the neurons in such artificial neural network.

2. Description of Related Art

There has been a great deal of interest in developing non-volatile associative electronic memories based on models of neural networks. A key feature of artificial neural networks is the vast number of synapses that must interconnect each neuron with many others.

Several different approaches have been tried for providing the vast number of synapses required in any artificial neural network. One example is an optical approach, wherein light beams can cross one another without signal interference and, hence, offer a convenient way to form multiple interconnections. However, the lenses and lasers needed for such optical interconnective devices make such systems too bulky for broad applications. (See, for example, J. Kinoshita and N. G. Palevsky, "Computing with Neural Networks," *High Technology*, May, 1987, 24–61, 1987).

An electrochemically regulated synapse known as the "Memistor" was developed in the 1960's by Bernard Widrow, as part of a network known as the "Adaline" network, as disclosed by B. Widrow, in the publication "Neural Network Theory, Past and Present," Paper presented at the DARPA Neural Network Study Symposium, Lincoln Labs, 1987. The Memistor is an electrochemical cell in which copper is either plated on or deplated from a carbon rod. As a result of the controlled plating and deplating of copper, the resistance of the rod is continuously adjustable from 1–10 ohms. This provides a 10:1 range of synaptic "weights." The Memistor serves well from the standpoint of trainability, surviving numerous plating and deplating cycles. However, the Memistor does not lend itself to miniaturization and the device is not practical for large-scale networks.

Metal migration is an electrochemical process related to electroplating. Metal migration takes place between conductors in an active electronic circuit in the presence of a moisture film. Under the influence of a DC voltage, metal ions dissolve from the positive conductor (the anode). The dissolved ions migrate through the moisture film (the electrolyte) and plate out on the negative conductor (the cathode). The deposit often takes the form of metallic whiskers which eventually reach the anode and create an ohmic contact.

Metal migration has been observed with all of the metals commonly used in the electronics industry, but it occurs most readily with silver (see A. Dermarderosian, "The Electrochemical Migration of Metals," Proc. 1978 *Microelectronics Symp.*, 134–141, International Soc. for Hybrid Microelectronics, 1978). The minimum or "critical" voltage $V_c$ required to grow metallic whiskers can range from a few millivolts to over 2 volts, depending on the metal and prevailing conditions surrounding the electronic circuit. Once $V_c$ is exceeded, growth rates tend to increase linearly with $(V - V_c)$ (see P. B. Price, et al., "On the Growth Properties of Electrolytic Whiskers," ACTA Met., 6, 1968). The initial contact resistance is typically in the range of $10^4$–$10^6$ ohms, but with continued whisker growth, the contact resistance falls several orders of magnitude.

It has been observed that, depending on the medium, whisker growth between copper conductors proceeds either from the cathode to the anode (as usual), or from the anode to cathode, which is the reverse of other metals (see A. Dermarderosian, "Raw Material Evaluation through Moisture Resistance Testing," Proc. IPC, 1976). When growth proceeds from anode to cathode, the whiskers are known as "Conductive Anodic Filaments" or CAF (see J. P. Mitchell and T. L. Welsher, "Conductive anodic filament growth in printed circuit materials," Proc. Printed Circuit World Convention II, Session 2A, pp. 42–55 (1981); J. N. Lahti, R. H. Delaney, and J. N. Hines, "The characteristic wearout process in epoxy-glass printed circuits for high density electronic packaging," Proc. *Reliability Phys. Symposium*, San Francisco (1979); J. Lando, J. P. Mitchell, and T. L. Welsher, "Conductive anodic filaments in reinforced polymeric dielectrics; formation and prevention," ibid. (1979); T. L. Welsher, J. P. Mitchell and D. J. Lando, "CAF in composite printed circuit substrates: characterization, modeling, and a resistant material", *Annual Report*, Conference on Electrical Insulation and Dielectric Phenomena, 234–239 (1980)).

It has been suggested that the undesirable growth of metal whiskers observed in electronic circuits be utilized positively to provide the weighted or adjustable synapses in a neural network. Attempts to utilize metal whiskers as interconnects or neural network synapses were not successful, however, because of the inability to reverse the process of whisker growth. In order for metal whisker growth to provide practical synapse interconnects, it is crucial that the whisker growth process be reversible.

In view of the above, it would be desirable to provide electrochemically regulated synapses adapted for use in neural networks wherein the synapse is a solid state configuration which is adapted for miniaturization for use in large scale neural networks.

SUMMARY OF THE INVENTION

In accordance with the present invention, electrochemical synapses are provided for use in neural networks wherein the electrochemical synapses are solid-state devices which are well suited for miniaturization to provide the extremely large number of synapses which are required for a neural network. The invention is based upon providing a permanent interconnect between the input and output terminals of a synapse, such that the conductivity of the synapse is regulated by means of solid-state electrochemistry.

As one feature of the present invention, the conductivity of the permanent interconnect of the synapse is regulated by increasing or decreasing the chemical reactivity (e.g., pH) of the moisture film absorbed on the permanent interconnect. Variations in pH or other chemical properties result in variations in whisker growth and provide a way to actually reverse metallic whisker growth. The ability to vary and even reverse whisker growth by controlling chemical properties provides a solid-state, electrochemical synapse which is especially well suited for use in neural networks.

As another feature of the present invention, the growth of metallic whiskers between the input and output terminal of the synapse is controlled by varying the DC voltage applied across the permanent interconnect. Permanent interconnects made from carbon having an absorbed moisture film present thereon are well suited for producing permanent interconnects on which metallic whisker growth can be controlled in accordance with the present invention by pH and DC voltage changes.

As another feature of the present invention, permanent interconnects are provided which include mixed halides of rubidium with copper or silver. Such interconnects are solid-state systems which have conductivities that can be reversibly controlled. In addition, ion insertion compounds also provide suitable permanent interconnects having conductivities which can be regulated in accordance with the present invention.

The solid state electrochemical synapses, in accordance with the present invention, are well suited for use in neural networks where the synapse terminals are spaced apart at distances of less than 100 microns. The rate at which metallic whiskers can be grown or eliminated is such that conductivity over such interterminal distances can be rapidly varied to provide the rapid changes in synapse memory or weighting required for neural networks.

The above discussed and many other features and attendant advantages of the present invention will become better understood by reference to the following detailed description when taken in conjunction with the following drawings.

BRIEF DESCRIPTION OF THE DRAWINGS

FIG. 1 is a schematic representation of a single electrochemical synapse in accordance with the present invention.

FIG. 2 is a schematic representation of a simple interconnect arrangement which includes a plurality of electrochemical synapses in accordance with the present invention.

FIG. 3 is a schematic representation of a multilayer interconnect arrangement including a plurality of synapses in accordance with the present invention.

DETAILED DESCRIPTION OF INVENTION

The present invention involves solid-state, electrochemical synapses which are adapted for use in neural networks. A preferred exemplary electrochemical synapse in accordance with the present invention is shown generally at 10 in FIG. 1. The electrochemical synapse includes an input terminal 12, an output terminal 14, and a permanent interconnect 16 located therebetween. The permanent interconnect 16 forms an electrolytic path between the input terminal 12 and output terminal 14. The permanent interconnect has a small, but finite conductivity. The input terminal 12 and output terminal 14 are spaced apart a distance of less than 100 microns. Preferably, the spacing between the input terminal 12 and output terminal 14 will be on the order of 5-10 microns. A DC voltage is provided across the permanent interconnect 16 by voltage source 18 which is connected to the input terminal 12 and output terminal 14 by way of electrical connections 20 and 22, respectively.

The input and output terminals 12 and 14 are made from suitable metals, such as gold, indium, palladium, platinum, bismuth, silver, cadmium, tin, copper, or lead. As will be discussed below, in one embodiment of the present invention, it is required that one of the terminals be a non-migratable metal such as gold, indium, palladium or platinum, and that the other terminal be a migratable metal such as copper, bismuth, silver, cadmium, tin, or lead. The permanent interconnect 16 is made from a variety of different materials, depending upon the particular means which is being used for controllably varying the conductivity of the interconnect 16.

A preferred embodiment in accordance with the present invention involves controllably growing metal whiskers between the terminals in order to provide variable conductivity. A carbon channel or other carbon deposited layer is the preferred permanent interconnect for the growth of metal whiskers. The absorbed moisture present in the carbon-based permanent interconnect provides an electrolytic medium in which metal whiskers may be grown. Although a number of different metal whiskers may be grown in accordance with the present invention, copper and silver whiskers are preferred.

As previously mentioned, in certain media, the growth of whiskers between copper terminals, can proceed in a direction from anode to cathode, which is the reverse of other metals. The copper whiskers are then known as conductive anodic filaments or CAF. Their growth takes place by anodic dissolution of the positively biased conductor, migration of the dissolved copper ions down the voltage gradient and precipitation of the copper in the form of a conductive copper oxide.

The precipitation of copper occurs because of pH changes associated with parallel electrode reactions involving the water present in the electrolytic solution provided by the absorbed moisture. Under the influence of an applied voltage, the water reacts at the anode to yield oxygen and hydrogen ions (acid) and at the cathode to yield hydrogen gas and hydroxyl ions (base).

The solubility of copper ions decreases as the pH rises, so that they remain in solution only in a narrow zone close to the anode. As the copper ions migrate into the more neutral electrolyte displaced away from the anode, the copper ions precipitate as the low-density oxide filaments. The spongy oxide product fills the narrow gap to the anode so that the filaments appear to grow directly from the anode.

The copper oxide whiskers grow preferentially along pre-existing paths. This preferred growth path is believed to be due to the hygroscopic nature of copper oxide which would tend to enhance the absorption of moisture. Once a copper oxide whisker connects the two electrodes, the resistance falls progressively with time. This fact, coupled with the controlling influence of pH, provides a capability for controlling whisker growth and removal.

Changes in pH are particularly effective for controlling the growth of CAF. CAF grows by anodic dissolution of copper and precipitation of copper oxide at high pH. By using a reverse DC bias, in which the anode is the non-migratable metal, no metal dissolves and a low pH is produced by the only other possible reaction, the oxidation of water. The resulting acidity redissolves the CAF. Experiments have shown that new whiskers tend to grow most readily in the presence of already established whiskers. This result indicates a mechanism of parallel electronic and ionic pathways. Therefore, the ionic pathway remains operative in the presence of the electronic whisker short and can lead to the gradual removal of that short by acid dissolution.

Deplating can be carried out in a similar manner. For metals such as silver, cadmium, tin and lead, the reverse DC bias dissolves metal from the adjacent whisker metal, but not from the non-migratable metal terminal. The result is to replate the whisker metal onto the original contact or terminal. The reverse DC bias is applied either to specific synaptic connections or it may be applied as a low-level back bias to all connections in a system to provide a form of controlled "forgetfulness".

In another preferred embodiment, the carbon permanent interconnect is replaced with a solid electrolyte such as the mixed halides of rubidium with copper or silver. (See W. Van Gool, Solid Electrolytes, Academic Press, New York, 1978). Whisker growth then entails moving ions in and out of the substrate with no moisture film being required.

Solid electrolytes are part of a large class of materials known as ion insertion compounds such as those described by D. F. Shriver and G. C. Farrington in "Solid Ionic Conductors", Chem. and Eng. News, May 20, 42-57 (1985). In general, the compounds have both ionic and electronic conductivity. Use of these ion insertion compounds provides the ability to control conductivity at both a zero level and at much higher levels utilizing the insertion compounds as a source of ions.

A particularly preferred ion insertion compound for use as the permanent interconnect is tungsten trioxide. Tungsten trioxide is a poor conductor when pure, but in the presence of moisture and DC voltage, it becomes electrochemically doped with hydrogen ions. This results in the formation of a metallic conductor known as hydrogen tungsten bronze (See P. J. Shaver, Appl. Phys. Lett., 11, 255, 1967.)

The use of an ion insertion compound, such as tungsten trioxide, allows the required reversal and control of metal deposition by the process of corrosion. Specifically, electrons released by metal ionization are scavenged by oxygen in the environment surrounding the interconnect. In the case of hydrogen tungsten bronze, a gradual reversion to tungsten trioxide will occur. The electrochemical reaction is:

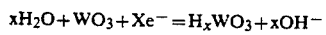

$$xH_2O + WO_3 + Xe^- = H_xWO_3 + xOH^-$$

The balancing reaction at the other electrode is:

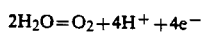

$$2H_2O = O_2 + 4H^+ + 4e^-$$

The above two reactions proceed from left to right during hydrogen entry and from right to left during hydrogen loss. The slow reaction of hydrogen tungsten bronze with oxygen is one example of how manipulation of the environment can be used to gradually weaken a synapse to provide a controlled rate of conductivity. General exposure to oxygen, therefore, causes a homogenous conversion of $H_xWO_3$ to $WO_3$ as an alternative to the rapid (approximately one second) electrochemical reversal process.

Exposure to oxygen can also be used to dissolve metallic whiskers in the presence of hydrogen ions e.g.:

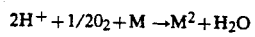

$$2H^+ + 1/2O_2 + M \rightarrow M^2 + H_2O$$

where M represents any non-noble metal, such as copper, nickel, iron, zinc, or cadmium.

There are several other examples in which the conductivity of the interconnect is regulated by means of reactive gases. One example involves the use of an acidic gas such as carbon dioxide to lower the pH of the adsorbed moisture film or electrolyte. The acidity tends to redissolve the material. This leads to reversal of whisker growth and resulting reductions in conductivity. Carbon dioxide is particularly preferred for copper based systems because it can also act as a mild complexing agent to enhance metal solubility. Other reactive gases which may be used to control growth and dissolution of the metal whisker include chlorine, bromine vapor, iodine vapor, sulfur dioxide, hydrogen chloride, hydrogen bromide, hydrogen iodide, nitrogen oxides, ammonia, carbon monoxide, or hydrogen.

FIGS. 2 and 3 diagrammatically depict possible multiple interconnect systems utilizing electrochemical synapses in accordance with the present invention. FIG. 2 illustrates a two dimensional multiple interconnect system and FIG. 3 depicts a three-dimensional interconnect system.

The arrangements illustrated in FIGS. 1-3 may be implemented using any state-of-the-art printed wiring board (PWB), integrated circuit, or hybrid circuit technologies. For example, the two-dimensional arrangement shown in FIG. 2 may be constructed using 2-sided PWB technology. Three options for constructing the more complex arrangement shown in FIG. 3 are: multilayer thick-film technology (using screened conductor pastes and glass-refractory dielectrics), co-fired multilayer ceramic technology, and multilayer thin-film technology (using metal film conductors and polymer dielectrics).

Referring to FIG. 2, a two-dimensional design is shown generally at 30. Input terminals made of gold are shown at 32. The input terminals 32 are placed together with bridge terminals 34 made of silver on one side of the PWB. Output terminals 36, made from gold, are placed on the other side of the PWB. Appropriate traces are shown diagrammatically connecting the gold outputs 36 to the silver bridge terminals 34. The connections between the output traces 36 and bridges 34 are preferably made with plated through-holes. Utilizing the conductivity control methods set forth with respect to FIG. 1, whisker growth and removal are carried out along the paths indicated in FIG. 2 by the dotted lines. The resistance of each path is regulated independently. The result is a combination of electrochemical synapses which can be used to provide a neural network.

A three-dimensional electrochemical synapse system is shown diagrammatically in FIG. 3 at 40. The system 40 utilizes multilayer technology wherein inputs 42 and outputs 44 are laid down as parallel traces on the first and third layers of a multilayer structure. The second layer 46 consists of migratable bridge traces laid down at right angles to inputs 42 and outputs 44. Paths between the three sets of traces are defined by forming vertical vias at the crossing points and filling them with an ion insertion material as previously described. Interconnections are then grown and removed by the techniques previously described.

The black heavy lines interconnecting the inputs 42, bridge 46 and outputs 44 in FIG. 3 illustrates how interconnections are established for one exemplary bridge. The thickness of the black interconnecting lines depicts different levels of conductivity as regulated in accordance with the present invention. Preferably, there are enough bridge traces to allow each input 42 to be connected with every output 44 and vice versa.

FIGS. 2 and 3 are representative portions of large neural networks having many synaptic junctions. The operation of such large-scale neural networks requires short cycle times for training the synaptic junctions. The exact rates of whisker growth and removal in accordance with the present invention depend on the factors previously described.

Preferably, the whisker growth and removal rate will allow growth and removal cycle times of a few seconds. For example, the growth or removal rate of a metal whisker is proportional to the current density in amperes per square centimeter at the whisker tip. Although the total current may be minuscule, the small diameter of a whisker, typically a fraction of a micron, yields current densities of ten amps per square centimeter or more. For a metal valence z, and atomic weight W and a density of $\rho$ grams per cubic centimeter, a current density of 10 amps per square centimeter corresponds to a tip velocity of $10 \, W/zF \, \rho$ cm/sec where F is the Faraday constant.

If silver anodes are used, a tip velocity of 10.6 microns per second is achievable in accordance with the present invention. When nickel is used as a migratable terminal, the growth velocity at the whisker tip is 3.4 microns per second. Growth rates of these magnitudes and even higher are possible in accordance with the present invention.

In large scale neural networks, the interconnection path length will be under 100 microns and preferably no more than a few microns. Accordingly, cycle times for growth and removal of whiskers in accordance with the present invention will be on the order of one second or less.

Having thus described exemplary embodiments of the present invention, it should be noted by those skilled in the art that the within disclosures are exemplary only and that various other alternatives, adaptations and modifications may be made within the scope of the present invention. Accordingly, the present invention is not limited to the specific embodiments as illustrated herein, but is only limited by the following claims.

What is claimed is:

1. An electrochemically regulated interconnection adapted for use in a neural network, said interconnection comprising:
   an input terminal;
   an output terminal located at a distance of less than 100 microns from said input terminal;
   a permanent interconnect between said input and output terminals, said permanent interconnect having a pH, a conductivity and comprising a migratable metal which forms whiskers along said permanent interconnect; and
   conductivity control means for regulating the conductivity of said permanent interconnect, said conductivity control means comprising means for increasing or decreasing the pH of said permanent interconnect thereby reversibly controlling the growth of said metallic whiskers.

2. An electrochemically regulated interconnection according to claim 1 which additionally includes means for applying a DC voltage across said permanent interconnect, said conductivity control means comprising means for increasing or decreasing the DC voltage applied across said permanent interconnect.

3. An electrochemically regulated interconnection according to claim 3 further comprising means for reversing the bias of said DC voltage.

4. An electrochemically regulated interconnection according to claim 2 wherein one of said input or output terminals comprises a non-migratable metal and the other of said input or output terminals comprises a migratable metal.

5. An electrochemically regulated interconnection according to claim 4 wherein said non-migratable metal is selected from the group consisting of gold, indium, palladium and platinum and said migratable metal is selected from the group consisting of bismuth, silver, cadmium, tin and lead.

6. An electrochemically regulated interconnection according to claim 1 wherein said permanent interconnect comprises carbon and moisture absorbed on the surface of said carbon.

7. An electrochemically regulated interconnection according to claim 1 wherein said permanent interconnect comprises mixed halides of rubidium with copper or silver.

8. An electrochemically regulated interconnection according to claim 1 wherein said permanent interconnect comprises an ion insertion compound.

9. An electrochemically regulated interconnection according to claim 1 wherein said permanent interconnect comprises carbon and moisture absorbed on the surface of said carbon.

10. An electrochemically regulated interconnection according to claim 9 wherein said input and output terminals comprise copper.

11. A method for operating an electrochemical interconnection for use in a neural network wherein said electrochemical interconnection includes a permanent interconnect between an input terminal and an output terminal, said permanent interconnect having a pH, conductivity and comprising a migratable metal which forms whiskers along said permanent interconnect, said method comprising the step of controllably increasing or decreasing the conductivity of said permanent interconnect by increasing or decreasing the pH of said permanent interconnect to thereby control growth of said metallic whiskers between said input terminal and said output terminal.

12. A method for operating an electrochemical interconnection according to claim 11 wherein said conductivity is controllably increased or decreased by varying a DC voltage applied across said permanent interconnect.

13. A method for operating an electrochemical interconnection according to claim 12 further comprising means for reversing the bias of said DC voltage.

14. A method for operating an electrochemical interconnection according to claim 12 wherein one of said input or output terminals comprises a non-migratable metal and the other of said input or output terminals comprises a migratable metal.

15. A method for operating an electrochemical interconnection according to claim 14 wherein said non-migratable metal is selected from the group consisting of gold, indium, palladium and platinum and said migratable metal is selected from the group consisting of bismuth, silver, cadmium, tin and lead.

16. A method for operating an electrochemical interconnection according to claim 11 wherein said step of controllably increasing or decreasing said conductivity comprises exposing said permanent interconnect to a corrosive gas.

17. A method for operating an electrochemical interconnection according to claim 11 wherein said permanent interconnect comprises carbon and moisture absorbed on the surface of said carbon.

18. A method for operating an electrochemical interconnection according to claim 17 wherein said input and output terminals comprise copper.

19. A method for operating an electrochemical interconnection according to claim 11 wherein said permanent interconnect comprises mixed halides of rubidium with copper or silver.

20. A method for operating an electrochemical interconnection according to claim 11 wherein said permanent interconnect comprises an ion insertion compound.

21. An electrochemically regulated interconnection adapted for use in a neural network, said interconnection comprising:

an input terminal;

an output terminal located at a distance of less than 100 microns from said input terminal wherein one of said input or output terminals comprises a non-migratable metal and the other of said input or output terminals comprises a migratable metal;

a permanent interconnect between said input and output terminals, said interconnect having a conductivity and a pH;

conductivity control means for regulating the conductivity of said interconnect by increasing or decreasing the pH of said interconnect; and means for applying a DC voltage across said permanent interconnect, said conductivity control means comprising means for increasing or decreasing the DC voltage applied across said permanent interconnect.

22. A method for operating an electrochemical interconnection for use in a neural network wherein said electrochemical interconnection includes a permanent interconnect between an input terminal and an output terminal wherein one of said input or output terminals comprises a non-migratable metal and the other of said input or output terminals comprises a migratable metal and wherein said permanent interconnect has a pH and a conductivity, said method comprising the step of controllably increasing or decreasing the conductivity of said permanent interconnect by increasing or decreasing the pH of said permanent interconnect, said increase or decrease in said conductivity being achieved by varying the DC voltage applied across said interconnect.

* * * * *